J. F. EYLAR.
Wheel-Cultivator.

No. 27,975.  Patented Apr. 24, 1860.

Witnesses:

Inventor.
Joseph J. Eylar

UNITED STATES PATENT OFFICE.

JOSEPH F. EYLAR, OF SCOTT, OHIO.

IMPROVEMENT IN CULTIVATORS.

Specification forming part of Letters Patent No. 27,975, dated April 24, 1860.

*To all whom it may concern:*

Be it known that I, JOSEPH F. EYLAR, of Scott, Adams county, Ohio, have invented a certain new and useful Improvement in Cultivators; and I hereby declare the following to be a full, clear, and exact description thereof, reference being had to the accompanying drawings, making part of this specification, in which—

Figure 1:
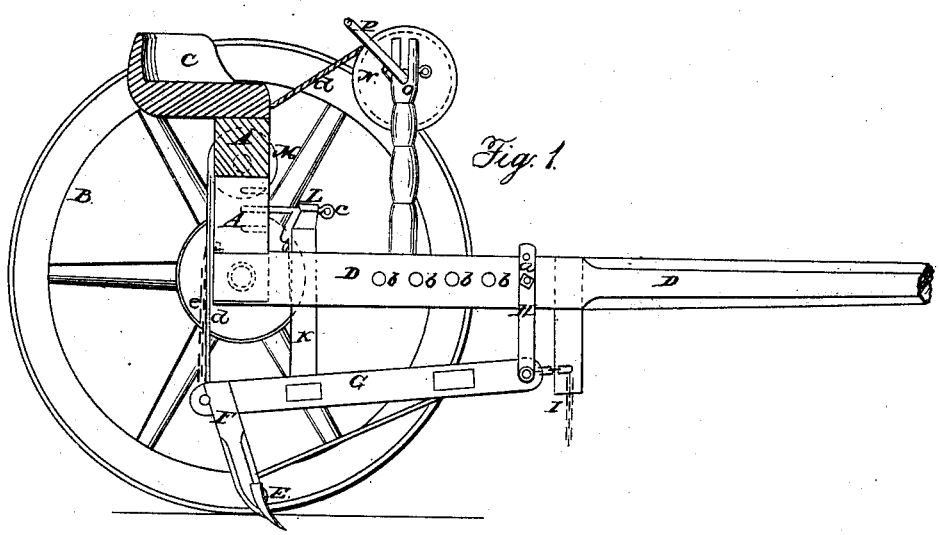
Figure 2:
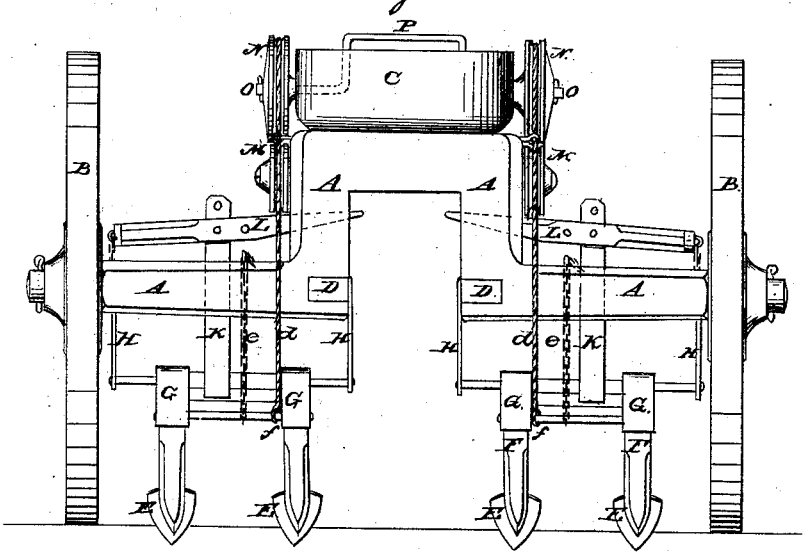

Figure 1 is a longitudinal sectional elevation of a cultivator embodying my improvement, and Fig. 2 is a back view of the same.

A is the axle and frame of the implement, mounted on wheels B B. A portion of the axle or frame is elevated midway between the wheels, and supports the driver's seat C, and is provided with two tongues or thills, D D. Each side of the axle A supports a pair of shovel-plowshares, their standards F being mortised to the beams or frames G G. The frames G are supported at their forward ends from the tongues D by hinged and adjustable straps or links H. These links are adjustable vertically and horizontally by means of holes $a$ and $b$ in the link and tongue, respectively.

I are adjustable brace-chains, attached between the plow-frames and projections from the tongues D. Standards K on the frames G connect adjustably, as shown, to levers L, on which the weight of the driver can be applied to assist at will to depress the shares. $c$ are pins, which may be placed, when required, immediately above the levers L, in holes represented by dotted lines in Fig. 1, for the purpose of keeping the plows down to their work.

The rear end of plow-frames are suspended from the axle by chains $e$. These chains can be readily adjusted to limit as desired the depth of working of the plows.

The plow-frames are adapted to be raised to clear the shares from the ground and admit of the implement being moved freely around by the following device: Chains or ropes $d$ are attached to the frames at $f$, and after passing over pulleys M connect to pulleys N on shaft O. A crank, P, is formed in this shaft, through which, by the feet of the driver, the shaft O may be rotated and the frames hoisted, so as to clear the plows of the ground. The implement is constructed with two tongues or shafts and an upwardly-bent axle, in order to preserve the growing crop from injury by the team or the implement.

The plow, if adjusted to work in line with the wheels, will follow any inequalities in the surface of the ground.

I claim as new and of my invention herein and desire to secure by Letters Patent—

The described arrangement of the plows E F, frames G, links H, chains I, standards K, levers L, chains or cords $d$, pulleys M N, and crank-shaft O P, constructed and operating in the manner and for the purposes set forth.

In testimony of which invention I hereunto set my hand.

J. F. EYLAR.

Witnesses:
GEO. H. KNIGHT,
FRANCIS MILLWARD.